United States Patent [19]
Deklotz

[11] Patent Number: 5,518,288
[45] Date of Patent: May 21, 1996

[54] MULTIPLE CONFIGURATION CARGO SYSTEM FOR PICKUP TRUCKS

[75] Inventor: Ralph E. Deklotz, Boise, Id.

[73] Assignee: Kenneth L. Taylor, Boise, Id.

[21] Appl. No.: 280,175

[22] Filed: Jul. 25, 1994

[51] Int. Cl.⁶ ............................... B60P 1/43; B62D 25/00
[52] U.S. Cl. ............................ 296/100; 296/10; 296/26; 296/61
[58] Field of Search ................................. 296/10, 26, 27, 296/37.6, 51, 57.1, 61, 100, 165, 176

[56] References Cited

U.S. PATENT DOCUMENTS

| | | | |
|---|---|---|---|
| 2,788,137 | 4/1957 | Harkness | 296/26 |
| 3,069,199 | 12/1962 | Reardon et al. | 296/100 |
| 3,995,890 | 12/1976 | Fletcher | 296/100 |
| 4,469,364 | 9/1984 | Rafi-Zadeh | 296/37.6 |
| 4,932,717 | 6/1990 | Swann | 296/226 |
| 4,943,108 | 7/1990 | Turnbull | 296/100 |
| 5,110,021 | 5/1992 | Dawson, Jr. | 296/100 |
| 5,209,543 | 5/1993 | Harkins, Jr. | 296/100 |
| 5,211,437 | 5/1993 | Gerulf | 296/61 |
| 5,342,105 | 8/1994 | Miles | 296/61 |

*Primary Examiner*—Dean Kramer
*Attorney, Agent, or Firm*—Frank J. Dykas

[57] ABSTRACT

A multiple configuration cargo system for a pickup truck as provided, having a front panel, a pair of side panels, a pair of side hinged roof panels and a pair of rear cargo panels. The cargo system is provided with a rear access insert that is a combination truck bed extension and ramp assembly, interfitting between the rear panels and closed roof panels. The ramp assembly is attached to the bed extension, for movement between a fully extended position angled from the ground to the bed of the truck and a partially extended support position wherein the ramp assemblies support the bed extending segment in a horizontal plane for weight bearing use. The roof panels meet along the longitudinal axis of the truck bed and pivotally move between (1) a closed position substantially parallel to the truck bed, (2) a vertically opened position in an upwards direction, and (3) an open position in a vertical and downwards direction into the cargo space defined by the side panels. Preferably, the side panels contain replaceable modular units modified for a plurality of dedicated uses.

9 Claims, 5 Drawing Sheets

MULTIPLE CONFIGURATION CARGO SYSTEM FOR PICKUP TRUCKS

BACKGROUND OF THE INVENTION

TECHNICAL FIELD

This invention relates to a cargo system for the conventional load bed of a pickup truck, and more particularly to a multiple configuration cargo system for pickup trucks comprising a pair of side cargo panels in combination with a pair of roof panels which may be converted between closed and opened position over the cargo space.

BACKGROUND

It is often desirable to enclose the load bed of a pickup. The bed of a pickup can be enclosed either for utilization as a sheltered and secured space area for camping and other recreational uses, or for a utility, cargo, loads, payloads, cargo transport and storage area, as well as other uses. In addition to traditional "camper" shells, a number of enclosures exist for pickup load beds. One example of a utility enclosure for a pickup truck can be found in U.S. Pat. No. 4,469,364, Rafi-Zadeh. Rafi-Zadeh shows a pickup cover that has a top panel that can be lowered or raised over a set of utility drawers. This patent illustrates one of the basic problems in existing pickup enclosures, namely although the bed of the pickup is covered, it is still difficult to access the part of the load bed located at the greatest distance from the tailgate and sides of the pickup bed. In addition, this style of cover still limits the height of loads that can be accepted in the truck bed and prohibits operation for working on pickup bed to position loads.

In an effort to improve access to the deeper recesses of the load bed, still other designs have been implemented. Another example is found in Swann, U.S. Pat. No. 4,932,717. Swann shows an articulated door that opens up the back panel and a portion of the roof section of the enclosure for the truck bed. Although Swann increases access into the deeper recesses of the load bed, the enclosure of Swann still limits the size of load that can be accommodated in the enclosed truck bed.

Another solution to improving access to the pickup load bed can be found in Turnbull, U.S. Pat. No. 4,943,108. Turnbull shows a cap for a pickup that is split centrally and longitudinally along the roof. This allows the cap for the pickup to open up to the outside of the truck bed, giving access to the entire pickup load bed. The load bed enclosure of Turnbull is an improvement in terms of accessibility to the load bed of the pickup, but in its open position, any oversize cargo cannot be transported because of the unstable configuration of the split halves of the enclosure in their open position.

A concomitant problem to the inaccessibility of the load bed of enclosed pickup beds is the difficulty of loading oversized carry-on loads such as furniture or appliances or wheeled vehicles, such as lawn and garden equipment, golf carts, all terrain vehicles, snow machines or motorcycles into the back of a pickup for transport. Gerulf, U.S. Pat. No. 5,211,437, shows one solution to this difficulty. Gerulf shows a combination tailgate and ramp assembly in which a pair of ramps can be fastened together and hinged to form a conventional tailgate, or when unfastened, the ramps can be rotated down and out to form a loading ramp.

With all of these designs, there still exists undesirable limitations, either that a person cannot stand upright in the truck bed when loading it, or in the case of Turnbull, if you can stand upright, the truck cannot be driven with the large load access capability.

What is still needed is a multiple configuration cargo system that opens and closes in a fashion to accommodate oversize loads, but still allows enclosure.

What is also needed is a cargo system that permits a number of options for enclosure of the cargo depending on the size and nature of the cargo to be placed in the truck bed.

What is further needed is a cargo system that allows several options on ways to open the enclosure for the loading and transport of cargo.

Additionally, what is still needed is an improved assembly for loading cargo and an improved option for a loading ramp for wheeled vehicles that need to be placed in the cargo bed.

DISCLOSURE OF INVENTION

The invention is a multiple configuration cargo system for use with a vehicle having a truck bed such as a conventional pickup truck. The invention is comprised of a pair of side panels, a pair of rear cargo panels with each panel having a base and a top, and a pair of roof panels. The roof panels meet along the longitudinal axis of the truck bed and are pivotally attached to the pair of side panels. The roof panels are designed for movement between three fixed positions. The roof panels can be fixed in a closed position in which the roof panels are substantially parallel to the truck bed and define a horizontal plane, or secondly the panels can be fixed in an open position in which three panels extend in a substantially vertical orientation in a generally upwards position above the horizontal plane, or thirdly, the roof panels can be fixed in a second open position in which the pair of roof panels extend in a substantially vertical orientation in a generally downwards direction below the horizontal plane, and into a cargo space defined by the side panels.

In the preferred embodiment, the cargo system also is comprised of a front panel, with the side panels, rear cargo panels and front panel all being of unitary construction. The cargo system also has the option of a rear access insert sized to interfit between the pair of rear panels and the closed roof panels. Ideally, the rear access insert further comprises a combination truck bed extension and a plurality of ramp assemblies. The ramp assembly is adapted for hinged attachment to the bed extending section for movement between a fully extended position wherein the ramp assemblies form an angled ramp from the ground to the bed of the truck in combination with the bed extension and a second partially extended support position wherein the ramp assemblies are in a substantially perpendicular orientation to the bed extension and support the bed extending segment in a horizontal plane for weight bearing use of the bed extension.

The rear panels, side panels and optional front panel may all be windowed to allow greater light infiltration and visibility into and out of the cargo space, as well as to improve the aesthetics of the cargo system. The side panels can also be adapted for interfitting with custom specialized options in modular units, including but not limited to cooking stoves or tool drawers.

BEST MODE FOR CARRYING OUT INVENTION

Figure 1:
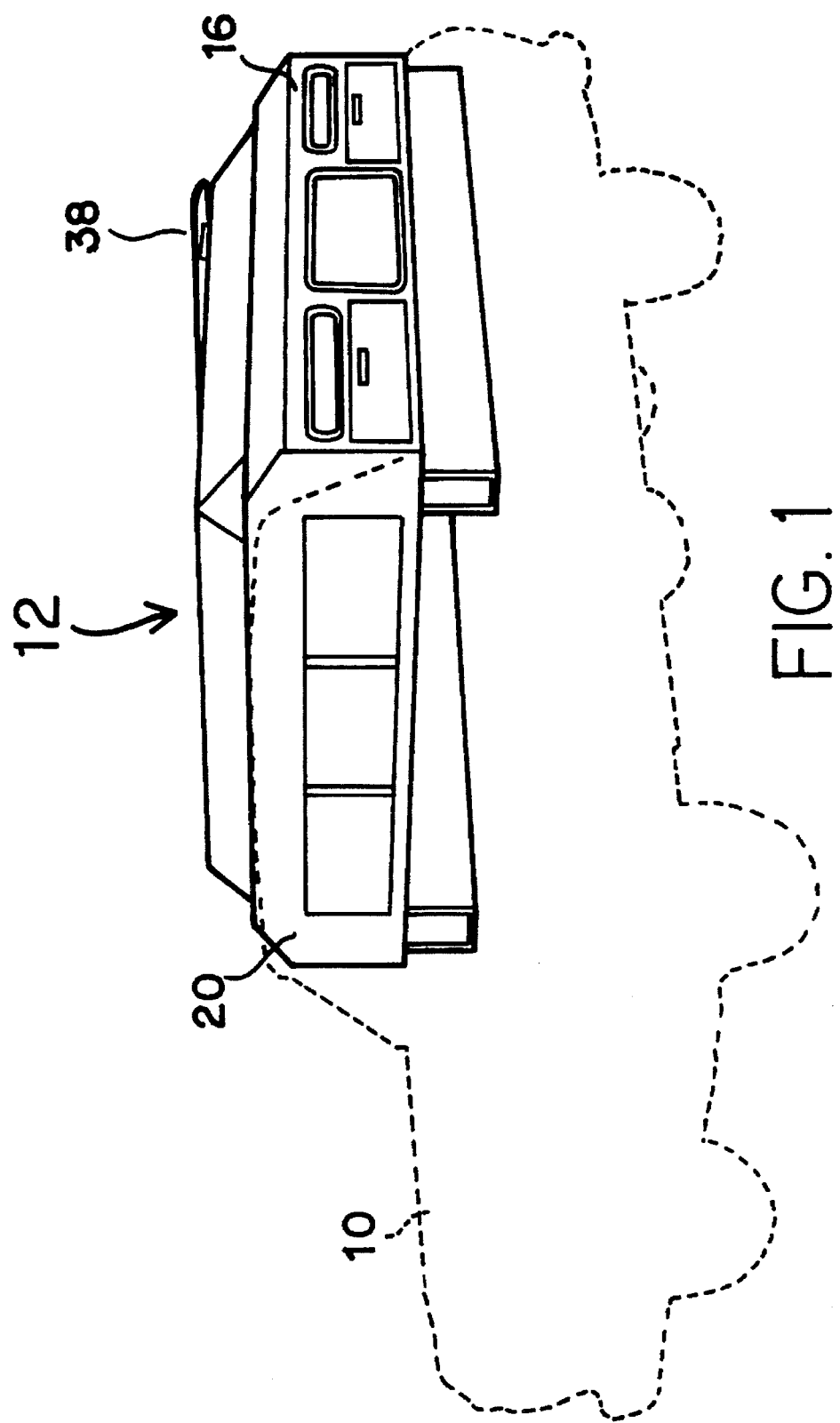
FIG. 1 is a perspective representational view of the present invention.

There is shown a conventional pickup truck 10, with a conventional load bed and the multiple configuration cargo system enclosure 12 of the present invention. In the preferred embodiment, cargo system 12 has a pair of roof panels 14, a pair of substantially parallel side panels 16, a pair of rear panels 18, and a front panel 20, with all of the panels being of unitary construction. The two rear panels 18 define rear access, cargo opening 22 to accommodate rear access insert 24 that is a combination load bed extension 26 and ramp assembly 28. Cargo system 12 has a unique pair of roof panels 14 that are pivotally attached to side panels 16. In the case of the preferred embodiment, roof panels 14 are pivotally attached by a conventional hinge system, here a continuous metal piano type hinge. Other materials can be used for the hinge system, such as synthetics including Polyhinge™. Roof panels 14 are manufactured from any material with suitable characteristics of structural strength and lightweight. In the preferred embodiment, roof panels 14 are made of a metal-skinned, foam-filled sandwich.

Figure 2:
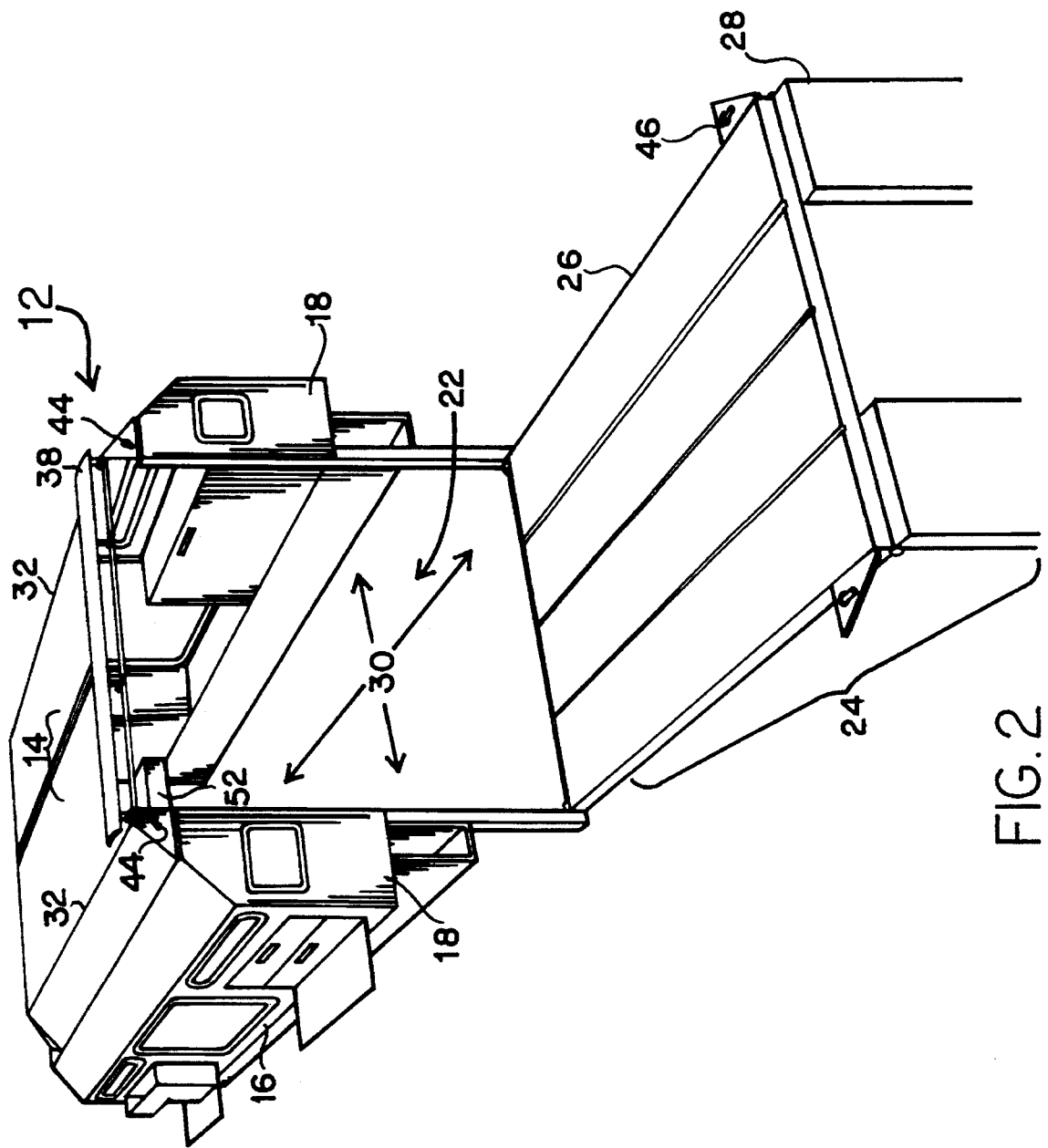
FIG. 2 is a rear perspective representational view of the present invention with the rear access insert showing use of the load bed extension.
Figure 3:
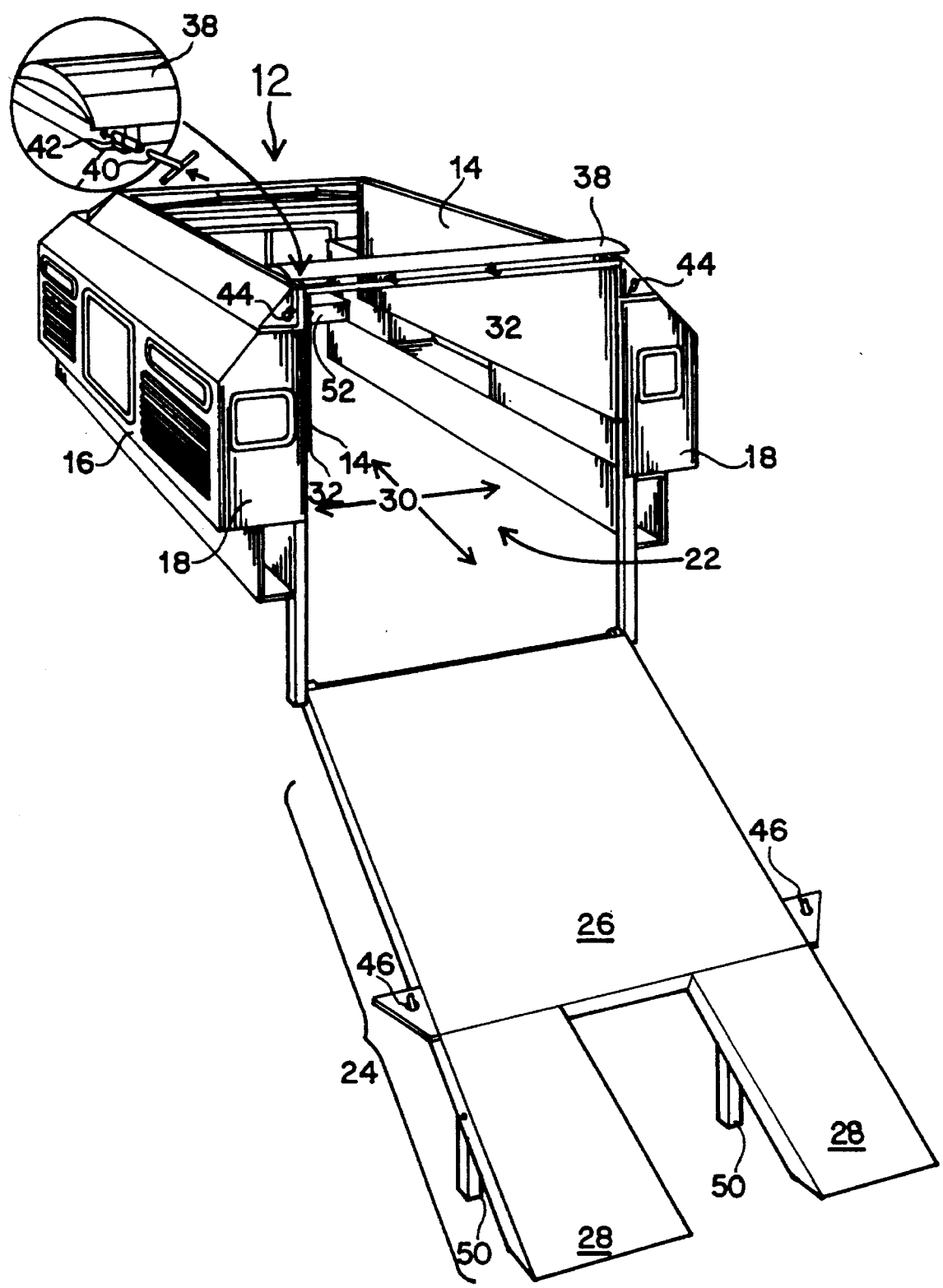
FIG. 3 is a rear perspective representational view of the present invention with the rear access insert extended for use of the ramp assembly and roof panels in the downward and open position.
Figure 4:
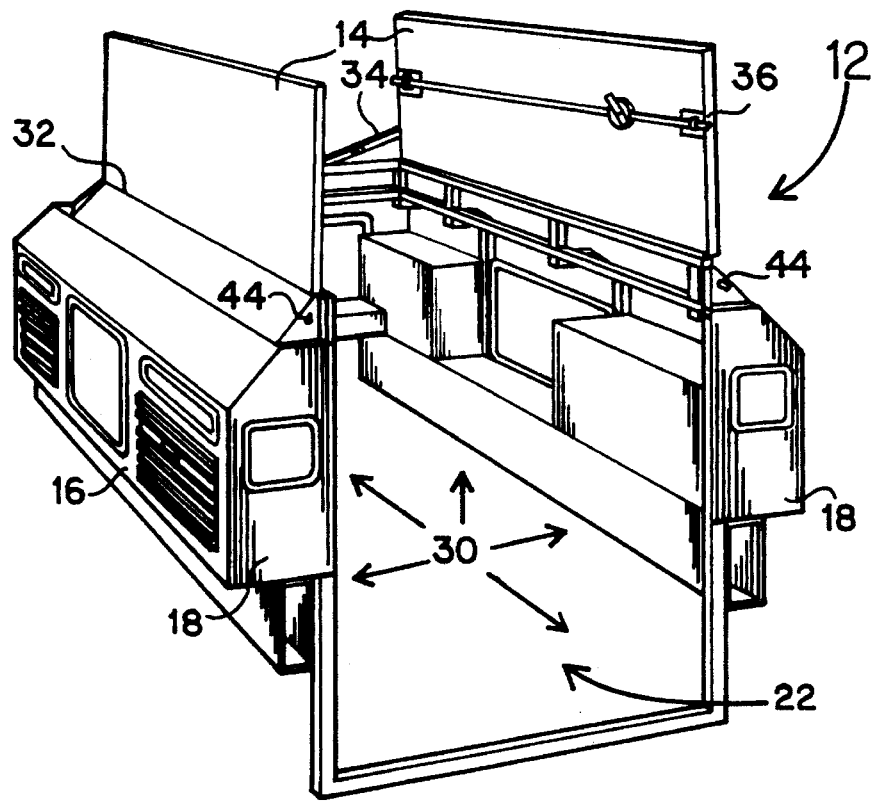
FIG. 4 is a rear perspective representational view of the present invention without the rear access insert and showing the roof panels in the upward open position.
Figure 5:
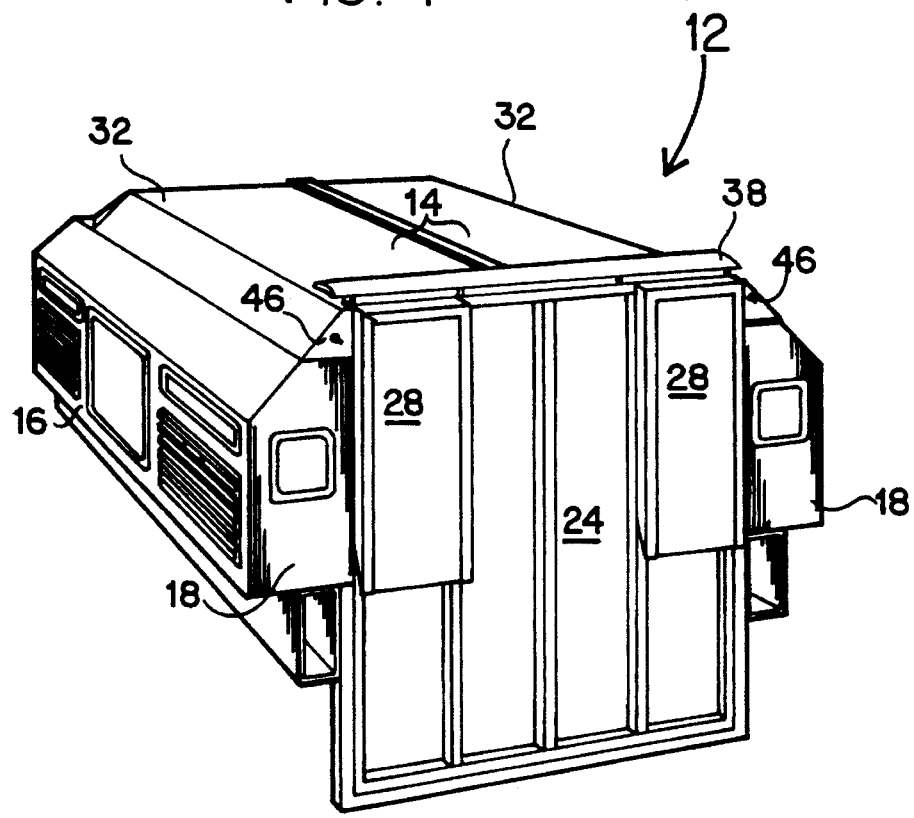
FIG. 5 is a rear perspective representational view of the present invention with the rear access insert in the closed position.

Roof panels 14 are designed for movement between the fully closed position illustrated in FIGS. 2 and 5 and two different open positions. In the first open position roof panels 14 extend in a substantially vertical and upwards direction above the horizontal plane as illustrated in FIG. 4. In the second open position roof panels 14 extend in a vertical and downward direction below the horizontal plane and into cargo space 30, as shown in FIG. 3.

In the preferred embodiment of the present invention, the height of side panels 16, front panels 20 and rear panels 18 is slightly above the top of the cab of the pickup truck, as seen in FIGS. 1–5.

Importantly, each roof panel is hinged to a side panel, along edge 32. In the first open position, that is vertical and upwards, each roof panel 14 can be secured in the open position by a releasable securing means 34, here by conventional door stays or lid supports as seen in FIG. 4. In the second open position, vertical and downward into cargo space 30, both roof panels 14 will remain in the downward open position by any appropriate latching device 36, here a rear operated slide latch.

In the preferred embodiment, roof panels 14 meet in the closed position with a tongue and groove edge mating and are held closed by a centerline-location rear operating slide latch system 36 that can cooperate with the latch system used to secure roof panels 14 in the second, downward open position. When closed, roof panels 14 form a weather tight seal through the attachment of conventional weather stripping in the tongue and groove edge mating of roof panels 14. In the fully closed position, roof panels 14 are stabilized and rigidly secured by mounting removable streamline-shaped cross brace member 38 perpendicular to longitudinal axis of the bed of truck 10 and across the span of both roof panels 14 as seen in FIGS. 2 and 5. Preferably, cross brace 38 is of an airfoil design and is located adjacent to rear panels 18. Cross brace 38 is mounted to roof panels 14 in any suitable manner, here by T-pins 40 and mating tubular receivers 42.

Rear panels 18, side panels 16 and optional front panel 20 may be windowed to allow greater light infiltration and improved visibility into and out of cargo space 30 and to improve the aesthetics of cargo system 12. Rear panels 18, side panels 16 and front panel 20 can be manufactured from any suitable material, such as ABS plastic, aluminum or steel. Side panels 16 have in the instance being described, been adapted for the interfitting of modular utility drawers and storage spaces, which can be accessed from either the interior or exterior of cargo system 12, as shown in FIG. 2. Side panels 16 can also be adapted for interfitting with other custom specialized modular units, including but not limited to trays, pet kennels, heating units, cooking stoves, sinks, basins, and coolers.

In the preferred embodiment cargo system 12 can be completely enclosed by the pivotal attachment of rear access insert 24 between rear panels 18 and closed roof panels 14. Rear access insert can be windowed or a solid planar sheet hingeably attached adjacent to truck bed and secured using any conventional securing means, for example a vise action grip latch 44.

Preferably, rear access insert 24 is a combination load bed extension 26 and ramp assembly 28 as seen in FIGS. 2,3 and 5. In the instance being described, rear access insert 24 is fabricated from an open mesh non-slip metal sheeting, such as expanded metal diamond shaped deck span. Rear insert 24 is composed of planar bed-extending section 26 and a pair of ramp assemblies 28. Rear insert 24 is sized to interfit between rear panels 18 and closed roof panels 14. Ramp assemblies 28 are hingeably attached, here using a pivot-assembly carry-through bolt bushing, to bed extending section 26 in a manner that allows ramp assemblies 28 to be folded flushly against extending section 26 when rear access insert 24 is in the closed position, as seen in FIG. 5.

Alternatively, ramp assemblies 28 may be partially extended and used to support bed extending section 26 in a horizontal position parallel and in the same plane as truck bed, as seen in FIG. 2. In the partially extended position, ramp assemblies 28 are substantially perpendicular to bed extension 26 and support bed extension for weight bearing use of same. In the closed position rear insert 24 is secured by a pair of vise action clamps.

Figure 6:
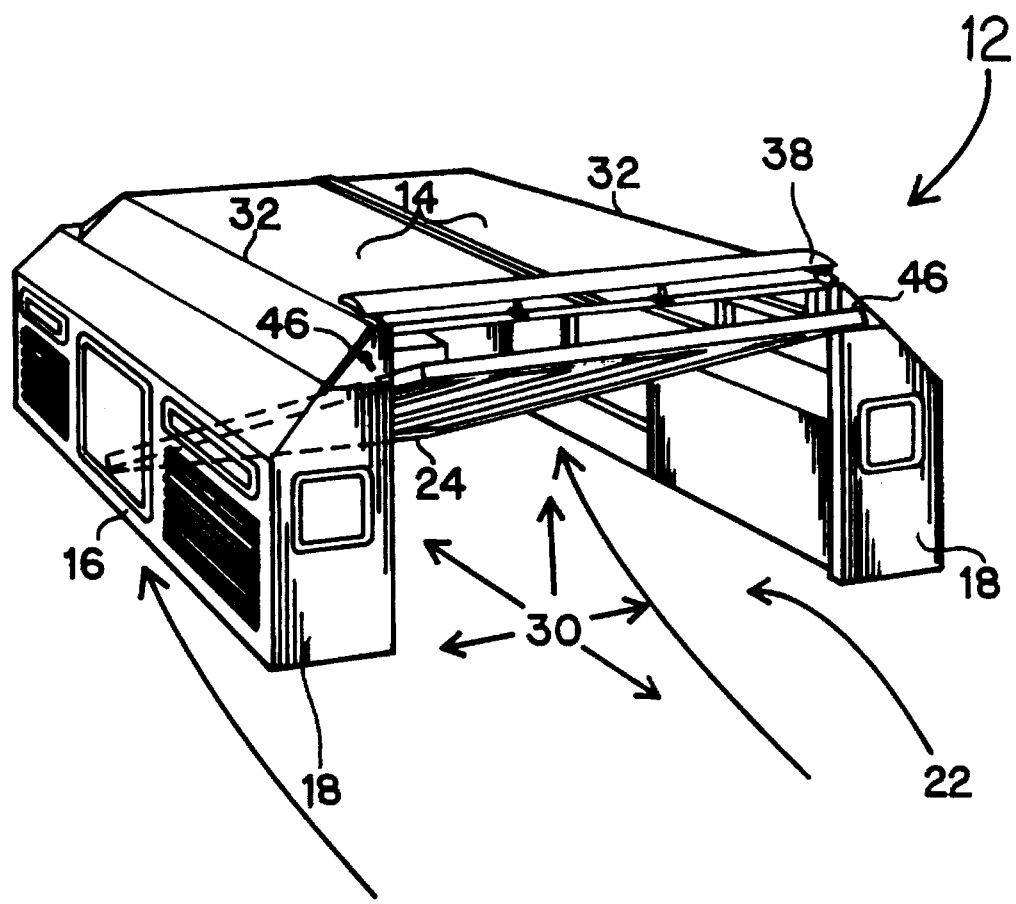
FIG. 6 is a rear perspective representational view of the present invention with the rear access insert in the storage and shipping position within the cargo space.

Additionally, in the preferred embodiment extended ramp assembly 24, including stub legs 50 are designed to be stowed in a substantially parallel position with the roof panels for flat storage of cargo system 12 and to facilitate stacking for shipping purposes, see FIG. 6.

In the fully extended position, as seen in FIG. 3, ramp assemblies 28 form an angled ramp 24 continuous from truck bed to ground in combination with bed extension 26. Preferably, ramp assemblies 28 include a vertical downward extending stub leg 50 to supplementally support heavy loads.

Cargo system 12 can be jacked on to a truck using conventional "camper jacks" and can be bolted or clamped to secure cargo system 12 to pickup truck 10. Cargo system 12 can be used in a number of different applications. The following are representative of the possible uses for cargo system 12. Modular utility drawers of side panels 16 can be pulled out and replaced, for example, with modular cook stove unit into side panels, which can then be accessed from either inside cargo space 30 or outside of pickup truck 10. Side panels 16 can also optionally include a carry through tube 52 in the front of side panel adjacent to cab of pickup 10. Carry through tube can be used to store longer sized items, such as shovels, plant trimmers, weed eaters, fishing rods, golf clubs or tripods.

To access cargo system 12 from the rear of truck 10, truck tailgate must be removed. To open cargo system 12 in the preferred embodiment, both vise action latches 44 on rear access insert 24 are turned and opened. Bed extension 26 and ramp assembly 28 can then be lowered and extended with supplemental support stub legs 50 falling into place on the ground. Ramp assembly 24 can then be walked up to remove streamline cross brace 38 from roof panels 14. Roof panels 14 can then be opened to the outward open position and fixed with lid supports 34. Cargo space 30 is now ready for vehicle or equipment for load introduction into cargo space 30. In this configuration a person can walk in, without stooping, drive in, or push/pull any load into cargo space 30. After the load is in place, roof panels 14 can be returned to the closed position and closed with slide latches 36 and streamline cross brace 38 can be replaced.

Alternatively, roof panels 14 can be opened to the downward position for oversize loads. For example, refrigerators, trees, or furniture such as dressers. The load can be installed into cargo space 30. Roof panels 14 can be secured in the downward open position with slide latch mechanisms 36. After the load is installed, ramp 24 and bed extension 26 assembly can be raised and secured with the vise action grips 44 and the load is ready to be hauled. Ramp 28 and bed extension 26 assembly can be returned to the closed position and secured with slide latch 36.

Having described a preferred embodiment of the invention, it is understood that the invention is not so limited, but rather is limited only by the breadth and scope of the following claims and as may be broadened by the doctrine of equivalents.

I claim:

1. A multiple configuration cargo system for use with a vehicle having a truck bed, side walls, a longitudinal axis and a transverse axis, comprising:
   a pair of side panels;
   a pair of rear cargo panels, said rear cargo panels each having a base and a top; and
   a pair of roof panels, said roof panels meeting along the longitudinal axis of the truck bed and pivotally attached to the pair of side panels, for movement between (1) a closed position in which said roof panels are substantially parallel to the truck bed and define a horizontal plane, (2) an opened position in which said roof panels extend in a substantially vertical orientation in a generally upwards direction above the horizontal plane, and (3) an open position in which said pair of roof panels extend in a substantially vertical orientation in a generally downwards direction below the horizontal plane, and into a cargo space defined by the side panels.

2. The cargo system of claim 1 further comprising:
   a roof panel cross brace member removably attached to the pair of roof panels perpendicular to the longitudinal axis of the truck bed.

3. The cargo system of claim 2 further comprising a front panel, which with the side panels, front panel and rear cargo panels form a unitary structure.

4. The cargo system of claim 1 further comprising:
   a front panel, with said side, and front panels forming a unitary structure.

5. The cargo system of claim 1 further comprising:
   a rear access insert pivotally attached to each base of the pair of rear cargo panels.

6. The cargo system of claim 5 further comprising:
   a roof panel cross brace member removably attached to the pair of roof panels perpendicular to the longitudinal axis of the truck bed.

7. The cargo system of claim 5 wherein the rear access insert further comprises:
   a combination truck bed extension and ramp assembly having a planar bed extension sized to interfit between the pair of rear panels and closed roof panels; and
   a pair of ramp assemblies adapted for hinged attachment to the bed extension for movement between (1) a fully extended position wherein said ramp assemblies form an angled ramp from the ground to the bed of the truck in combination with the bed extension and (2) a partially extended support position wherein said ramp assemblies are in a substantially perpendicular orientation to the bed extension and support the bed extending segment in a horizontal plane for weight bearing use of the bed extension.

8. In the cargo system of claim 1 a rear access insert further comprising:
   a combination truck bed extension and ramp assembly having a planar bed extension sized to interfit between the pair of rear panels and closed roof panels; and
   a pair of ramp assemblies adapted for hinged attachment to the bed extension for movement between (1) a fully extended position wherein said ramp assemblies form an angled ramp from the ground to the bed of the truck in combination with the bed extension and (2) a partially extended support position wherein said ramp assemblies are in a substantially perpendicular orientation to the bed extension and support the bed extending segment in a horizontal plane for weight bearing use of the bed extension.

9. A multiple configuration cargo system for use with a vehicle having a truck bed, side walls, and a longitudinal axis and a transverse axis, comprising:
   a front panel;
   a pair of side panels, together with said front panel forming a unitary structure, said side panels further containing removable and selectively replaceable modular units modified for a plurality of dedicated uses;
   a pair of roof panels, said roof panels meeting along the longitudinal axis of the truck bed and pivotally attached to the pair of side panels, for movement between (1) a closed position in which the said roof panels are substantially parallel to the truck bed and define a horizontal plane, (2) an open position in which said roof panels extend in a substantially vertically orientation in a generally upwards direction above the horizontal plane, and (3) an open position in which said pair of roof panels extend in a substantially vertical orientation in a generally downward direction below the horizontal plane, and into a cargo space defined by the side panels;

a pair of rear cargo panels, each rear panel having a base and a top, and a rear access insert pivotally attached to each base of the pair of rear cargo panels, wherein the rear access insert further comprises a combination truck bed extension and ramp assembly having a planar bed extending section sized to interfit between the pair of rear panels and roof panels, said roof panels being in a closed position, and a pair of ramp assemblies adapted for hinged attachment to the bed extending section, for movement between (1) a fully extended position wherein said ramp assemblies form an angled ramp from the ground to the bed of the truck in combination with the bed extension, and (2) a partially extended support position wherein said ramp assemblies are in a substantially perpendicular orientation to the bed extension in support of the bed extending section in a horizontal plane for weight bearing use of the bed extension.

* * * * *